(12) United States Patent
Sakano et al.

(10) Patent No.: US 9,925,524 B2
(45) Date of Patent: Mar. 27, 2018

(54) EXHAUST GAS PURIFICATION CATALYST (71) Applicant: Toyota Jidosha Kabushiki Kaisha, Toyota-shi Aichi-ken (JP)

(72) Inventors: Mitsuru Sakano, Toyota (JP); Yusaku Inatomi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/211,367

(22) Filed: Jul. 15, 2016

(65) Prior Publication Data
US 2017/0014804 A1 Jan. 19, 2017

(30) Foreign Application Priority Data
Jul. 17, 2015 (JP) .................. 2015-143499

(51) Int. Cl.
| | | |
|---|---|---|
| *B01J 23/46* | (2006.01) | |
| *F01N 3/08* | (2006.01) | |
| *B01J 23/42* | (2006.01) | |
| *B01J 27/16* | (2006.01) | |
| *B01J 21/06* | (2006.01) | |
| *B01J 35/00* | (2006.01) | |
| *B01D 53/94* | (2006.01) | |
| *B01J 21/04* | (2006.01) | |
| *B01J 23/96* | (2006.01) | |

(52) U.S. Cl.
CPC ........ *B01J 23/464* (2013.01); *B01D 53/9422* (2013.01); *B01J 21/04* (2013.01); *B01J 21/063* (2013.01); *B01J 21/066* (2013.01); *B01J 23/42* (2013.01); *B01J 23/96* (2013.01); *B01J 27/16* (2013.01); *B01J 35/0006* (2013.01); *F01N 3/0814* (2013.01); *F01N 3/0842* (2013.01); *B01D 2255/1021* (2013.01); *B01D 2255/1025* (2013.01); *B01D 2255/2022* (2013.01); *B01D 2255/2042* (2013.01); *B01D 2255/2065* (2013.01); *B01D 2255/2092* (2013.01); *B01D 2255/20707* (2013.01); *B01D 2255/20715* (2013.01); *B01D 2255/40* (2013.01); *B01D 2255/91* (2013.01); *B01D 2258/012* (2013.01); *F01N 2370/02* (2013.01); *F01N 2510/06* (2013.01)

(58) Field of Classification Search
None
See application file for complete search history.

(56) References Cited

U.S. PATENT DOCUMENTS

2014/0221198 A1    8/2014   Nagao et al.

FOREIGN PATENT DOCUMENTS

| JP | 2004167354 | * | 6/2004 |
| JP | 2006043637 | A | 2/2006 |
| JP | 2013252465 | A | 12/2013 |

OTHER PUBLICATIONS

Abstract of Suda JP 2004/167354 (2004).*

* cited by examiner

*Primary Examiner* — Melvin C. Mayes
*Assistant Examiner* — Sheng H Davis
(74) *Attorney, Agent, or Firm* — Dinsmore & Shohl LLP (57) ABSTRACT

The present disclosure provides an exhaust gas purification catalyst having improved performance for purifying an exhaust gas, in particular, an exhaust gas containing NOx. The exhaust gas purification catalyst of the present disclosure includes Rh-supporting composite oxide support particles containing Al, Zr, and Ti and Rh-supporting aluminum phosphate-based support particles. Furthermore, in the exhaust gas purification catalyst of the present disclosure, the ratio of the moles of metals constituting the aluminum phosphate-based support particles, relative to the total moles of metals constituting the composite oxide support particles and the aluminum phosphate-based support particles is 7.5% or more and 15.0% or less.

9 Claims, 4 Drawing Sheets

EXHAUST GAS PURIFICATION CATALYST

CROSS-REFERENCE TO RELATED APPLICATION

This application claims priority to Japanese Patent Application No. 2015-143499 filed on Jul. 17, 2015, the entire contents of which are hereby incorporated by reference into the present application.

TECHNICAL FIELD

The present disclosure relates to an exhaust gas purification catalyst. More specifically, the present disclosure relates to an exhaust gas purification catalyst having improved performance for purifying an exhaust gas, in particular, an exhaust gas containing NOx.

BACKGROUND ART

Exhaust gas emitted from an internal combustion engine such as a gasoline engine, diesel engine, etc., for an automobile and the like, contains components such as carbon monoxide (CO), hydrocarbon (HC), and nitrogen oxide (NOx).

Therefore, an exhaust gas purifying apparatus for decomposing and removing these components is generally provided in the internal combustion engine, and the components are substantially decomposed by an exhaust gas purification catalyst installed in the exhaust gas purifying apparatus. As such an exhaust gas purification catalyst, for example, a three-way catalyst, or a NOx storage/reduction catalyst has been known.

The three-way catalyst is a catalyst of simultaneously performing oxidation of CO and HC and reduction of NOx in a stoichiometric (theoretical air-fuel ratio) atmosphere.

The NOx storage/reduction catalyst is a catalyst where NOx in the exhaust gas is stored in a lean atmosphere and the NOx is reduced to nitrogen ($N_2$) in stoichiometric and rich atmospheres, and this catalyst cleverly utilizes the change of exhaust gas components in lean, stoichiometric, and rich atmospheres.

However, even when such a catalyst is employed, there is a problem in the purification of exhaust gas, and various studies have been made thereon.

In the catalyst for exhaust gas purification of Japanese Unexamined Patent Publication No. 2006-043637, a NOx storing material selected from the group consisting of an alkali metal, an alkaline earth metal, and a rare earth element; and a catalytic noble metal is supported on composite oxide support particles containing Al, Zr, and Ti. Then, the composite oxide support particles are porous, and the volume of pores having a diameter of 20 nm or less is 0.4 ml/g or more.

The catalyst support particles for exhaust gas purification of Japanese Unexamined Patent Publication No. 2013-252465 contain a phosphate, etc., represented by the formula: $MPO_4$ (wherein M is Y, La, or Al).

SUMMARY

The titanium oxide, etc., contained in the catalyst for exhaust gas purification of Japanese Unexamined Patent Publication No. 2006-043637 and the metal phosphate, in particular, aluminum phosphate, contained in the catalyst support particles for exhaust gas purification of Japanese Unexamined Patent Publication No. 2013-252465 have resistance to sulfur poisoning of the catalyst, and the NOx purification performance can be thereby enhanced. However, further improving the NOx purification performance is desired.

Accordingly, an object of the present disclosure is to provide an exhaust gas purification catalyst having improved performance for purifying an exhaust gas, in particular, an exhaust gas containing NOx.

A first aspect relates to an exhaust gas purification catalyst including Rh-supporting composite oxide support particles containing Al, Zr, and Ti and Rh-supporting aluminum phosphate-based support particles, wherein the aluminum phosphate-based support particles are support particles composed of aluminum phosphate, or aluminum phosphate in which a part of Al is substituted by Zr, and wherein the ratio of moles of metals constituting the aluminum phosphate-based support particles relative to the total moles of metals constituting the composite oxide support particles and the aluminum phosphate-based support particles is 7.5% or more and 15.0% or less.

A second aspect relates to an exhaust gas purification catalyst according to the first aspect, the aluminum phosphate-based support particles are support particles composed of aluminum phosphate in which a part of Al is substituted by Zr.

A third aspect relates to an exhaust gas purification catalyst according to the second aspect, wherein the support particles composed of aluminum phosphate in which a part of Al is substituted by Zr, are represented by the formula: $Al_\alpha Zr_{(1-\alpha)}PO_4$, and $\alpha$ is 0.80 or more and less than 1.00.

A fourth aspect relates to an exhaust gas purification catalyst according to the first through third aspects, further including Pt-supporting support particles.

A fifth aspect relates to an exhaust gas purification catalyst according to the fourth aspect, wherein the Pt-supporting support particles include composite oxide support particles containing Al, Zr, and Ti; and/or composite oxide support particles containing Ce and Al.

A sixth aspect relates to an exhaust gas purification catalyst according to the first through fifth aspects, wherein the exhaust gas purification catalyst is capable of purifying NOx.

A seventh aspect relates to an exhaust gas purifying method, including bringing a NOx-containing exhaust gas into contact with the exhaust gas purification catalyst according to the first through sixth aspects in a lean atmosphere, to store NOx, and reducing and purifying the NOx stored in the exhaust gas purification catalyst in a stoichiometric atmosphere or a rich atmosphere.

According to the present disclosure, an exhaust gas purification catalyst having improved performance for purifying an exhaust gas, in particular, an exhaust gas containing NOx, can be provided.

DETAILED DESCRIPTION

Embodiments are described in detail below. The following embodiments are not limiting, and various modifications are possible.

In the present disclosure, the "composite oxide support particles" means a material in which at least two kinds of metal oxides are at least partially formed in a solid solution. Accordingly, the composite oxide support particles of Al, Zr, and Ti mean that aluminum oxide, zirconium oxide, and titanium oxide are at least partially formed in a solid solution; and in particular, aluminum oxide, zirconium oxide, and titanium oxide are at least partially formed as an oxide with a single crystal structure. More specifically, for example, the "composite oxide support particles of Al, Zr, and Ti" may have not only a portion where aluminum oxide, zirconium oxide, and titanium oxide are formed as a solid solution, but also a portion where aluminum oxide, zirconium oxide, and titanium oxide are individually present.

In the description of the present disclosure, the "composite oxide support particles containing Al, Zr, and Ti" is also referred to as "Al—Zr—Ti composite oxide", and the "composite oxide support particles containing Ce and Al" is also referred to as "Ce—Al composite oxide".

In addition, in the description of the present disclosure, the catalyst containing a catalyst metal and catalyst support particles on which the catalyst metal is supported is also referred to as "catalyst metal/catalyst support particles". For example, the catalyst containing Rh as a catalyst metal and an Al—Zr—Ti composite oxide as catalyst support particles having supported thereon Rh is also referred to as "Rh/Al—Zr—Ti composite oxide".

<<Exhaust Gas Purification Catalyst>>

Conventional exhaust gas purification catalysts contain Rh-supporting support particles.

The catalyst metal employed in the exhaust gas purification catalyst includes platinum-group metals. Among platinum-group metals, Rh has a high capability of purifying an exhaust gas, in particular, removing NOx. Therefore, Rh can be suitably used in the exhaust gas purification catalyst.

By supporting the catalyst metal noted above on support particles, the performance of the exhaust gas purification catalyst is enhanced. This is achieved because the catalyst metal is supported throughout the surface of support particles having a large specific area and a sufficient contact area can thereby be obtained between the catalyst metal and an exhaust gas.

Meanwhile, a sulfur oxide (SOx) may be present in an exhaust gas. This SOx is further oxidized by the catalyst metal in a lean atmosphere, reacted with water vapor, and converted to sulfite ions or sulfate ions. It is believed that such ions react with a NOx storing material to produce a chemically stable sulfite salt or sulfate salt, and in turn, storage of NOx in the NOx storing material is suppressed.

In addition, basic support particles readily adsorb SOx, and there is thereby a possibility of promoting production of the above-described sulfite salt or sulfate salt. Furthermore, when SOx is adsorbed to the support particles, the support particles may easily be acidified and SOx is generally hard to desorb, as a result, storage of NOx in the NOx storing material may be suppressed.

On the other hand, the exhaust gas purification catalyst of the present disclosure contains Rh-supporting composite oxide support particles containing Al, Zr, and Ti and Rh-supporting aluminum phosphate-based support particles.

Titanium oxide as an oxide of Ti has durability at high temperature as well as catalytic ability of promoting the decomposition of sulfate salt, etc. In addition, zirconium oxide as an oxide of Zr produces $H_2$ through a water vapor reforming reaction, and this $H_2$ may efficiently reduce NOx. Aluminum oxide as an oxide of Al can further enhance the durability at high temperature. Accordingly, the composite oxide support particles containing Al, Zr, and Ti are a support suitable for the reduction of NOx.

In addition, since the aluminum phosphate-based support particles are an acidic support, this aluminum phosphate-based support particles have high capability of suppressing adsorption of SOx to the support and promoting the desorption of SOx. Accordingly, the aluminum phosphate-based support particles are a support suitable for the reduction of NOx.

However, in the case where the aluminum phosphate-based support particles, which is an acidic support, are used per se alone, there is a possibility of suppressing adsorption of NOx.

As regards this issue, in the exhaust gas purification catalyst of the present disclosure, the ratio (in percent) of moles of metals constituting the aluminum phosphate-based support particles, relative to the total moles of metals constituting the composite oxide support particles and the aluminum phosphate-based support particles, is 7.5% or more and 15.0% or less.

Therefore, according to the exhaust gas purification catalyst of the present disclosure, adsorption of NOx to the support can be promoted while suppressing adsorption of SOx to the support. Due to this action, in the exhaust gas purification catalyst of the present disclosure, the performance for purifying an exhaust gas, in particular, an exhaust gas containing NOx, can be improved, compared with conventional exhaust gas purification catalysts.

A plurality of constituent elements constituting the exhaust gas purification catalyst of the present disclosure are explained below.

<Rh>

Rhodium is supported on the composite oxide support particles containing Al, Zr, and Ti and on the aluminum phosphate-based support particles.

The supporting amount of Rh supported on the support particles is not particularly limited but, for example, per 100 parts by mass of the support particles, the Rh supported amount may be 0.01 parts by mass or more, 0.05 parts by mass or more, 0.1 parts by mass or more, 0.5 parts by mass or more, or 1 part by mass or more, and may be 5 parts by mass or less, 3 parts by mass or less, or 1 part by mass or less.

<NOx Storing Material>

The support particles optionally further contain a NOx storing material in combination with Rh.

The NOx storing material is not particularly limited but may include a basic material. The NOx storing material may include an alkali metal and a salt thereof, for example, potassium (K) and potassium acetate; an alkaline earth metal and a salt thereof, for example, barium (Ba) and barium acetate; and a combination thereof.

<Support Particles>

The support particles include composite oxide support particles containing Al, Zr, and Ti, and aluminum phosphate-based support particles.

In the present disclosure, the "aluminum phosphate-based support particles" means support particles composed of aluminum phosphate, or aluminum phosphate in which a part of Al is substituted by Zr.

As for the ratio of the composite oxide support particles and the aluminum phosphate-based support particles, the percentage ratio of the moles of metals constituting the aluminum phosphate-based support particles relative to the total moles of metals constituting the composite oxide support particles and the aluminum phosphate-based support particles may be 7.5% or more, 8.0% or more, or 9.0% or more, and/or 15.0% or less, 14.0% or less, or 13.0% or less.

(Composite Oxide Support Particles)

The ratio of Al, Zr, and Ti contained in the composite oxide support particles is not particularly limited, but as for the ratio of Ti and Zr, the percentage ratio of the moles of Zr relative to the total moles of Ti and Zr may be from 20 to 50%.

The percentage ratio of Al, Zr, and Ti contained in the composite oxide support particles is not particularly limited, but as for the ratio of Ti and Zr, and Al, the ratio of the moles of Al relative to the total moles of Ti and Zr may be from 100 to 900%.

Unless otherwise indicated, the "average particle diameter" as used in the present disclosure means an arithmetic mean value of measured values when randomly selected 10 or more particles are measured for the equivalent-circle diameter (Heywood diameter) by means of a scanning transmission electron microscope (STEM), etc.

(Aluminum Phosphate-Based Support Particles)

In the exhaust gas purification catalyst of the present disclosure, the aluminum phosphate-based support particles are preferably support particles composed of aluminum phosphate in which a part of Al is substituted by Zr.

Accordingly, in the exhaust gas purification catalyst of the present disclosure, the performance for purifying an exhaust gas, in particular, an exhaust gas containing NOx, is further improved.

Furthermore, in the exhaust gas purification catalyst of the present disclosure, the support particles composed of aluminum phosphate in which a part of Al is substituted by Zr, may be preferably represented by the formula: $Al_\alpha Zr_{(1-\alpha)} PO_4$.

The value of a of $Al_\alpha Zr_{(1-\alpha)} PO_4$ may be 0.80 or more, or 0.85 or more, and/or less than 1.00, or less than 0.95.

<Others>

In addition, the exhaust gas purification catalyst of the present disclosure can be applied to the following exhaust gas purifying method. Furthermore, the exhaust gas purification catalyst of the present disclosure can be produced by a method for producing an exhaust gas purification described hereinafter.

<<Exhaust Gas Purifying Method>>

In the method of the present disclosure for purifying an exhaust gas, a NOx-containing exhaust gas is brought into contact with the above-described exhaust gas purification catalyst of the present disclosure in a lean atmosphere to store NOx, and the NOx stored is reduced and purified in a stoichiometric atmosphere or a rich atmosphere.

The method of the present disclosure is preferably applied to an internal combustion engine operating in a lean atmosphere. The reason therefor is that in a lean atmosphere, HC and CO are readily oxidized and purified but NOx is hardly reduced and purified, leading to generation of a large amount of NOx.

As the method for bringing a NOx-containing exhaust gas into contact with the exhaust gas purification catalyst of the present disclosure in a stoichiometric atmosphere or a lean atmosphere, an optional method may be employed.

<<Production Method of Exhaust Gas Purification Catalyst>>

The method for producing the exhaust gas purification catalyst includes preparing a composite oxide support particles containing Al, Zr, and Ti; preparing aluminum phosphate-based support particles; and preparing a catalyst by stirring and calcining a mixed solution containing the composite oxide support particles, the aluminum phosphate-based support particles, a Rh salt, and a solvent.

<Step of Preparing Composite Oxide Support Particles>

The step of preparing composite oxide support particles is not particularly limited, and a known process may be employed. As the step of preparing a composite oxide support particles, for example, a process of mixing a salt of titanium, a salt of zirconium, a salt of aluminum, a solvent, and optionally a surfactant and a pH adjusting agent; and separating and/or calcining the resulting product may be employed.

<Step of Preparing Aluminum Phosphate-Based Support Particles>

The step of preparing aluminum phosphate-based support particles is not particularly limited, and a known process may be employed. As the step of preparing an aluminum phosphate-based support particles, a process of mixing a salt of aluminum, an optional salt of zirconium, phosphoric acid, a solvent, and optionally a pH adjusting agent; and separating and/or calcining the resulting product may be employed.

<Step of Preparing Catalyst>

In the step of preparing a catalyst, a mixed solution containing the composite oxide support particles containing Al, Zr, and Ti, the aluminum phosphate-based support particles, a Rh salt, and a solvent is stirred and calcined.

<Others>

As for the constituent elements in the method of the present disclosure, the description regarding the exhaust gas purification catalyst above may be referred to.

Embodiments are described in greater detail below by referring to Examples, but the embodiments are not limited to these Examples.

Examples

<<Synthesis of Catalyst Support Particles>>
<Production of Aluminum Phosphate (AlPO$_4$) Support Particles as Aluminum Phosphate-Based Support Particles>
(Step 1)

Solution A1 was prepared by mixing 112.5 g of Al(NO$_3$)$_3$.9H$_2$O and 900 mL of ion-exchanged water. Solution A2 was prepared by mixing 32.3 g of phosphoric acid (phosphorus content: 85 mass %) and 500 mL of ion-exchanged water. Solution A1 and A2 were mixed to prepare Solution A3, and the pH of Solution A3 was adjusted to be from 4.0 to 6.0 by adding aqueous ammonia (ammonia content: 28 mass %) to Solution A3.

(Step 2)

Solution A3 after the adjustment of pH was stirred overnight at room temperature. Thereafter, Solution A3 was centrifuged by a centrifugal separator (at 3,000 rpm for 10 minutes) to produce Precipitate A4. Precipitate A4 was separated from Solution A3, and the Precipitate A4 and 300 mL of ion-exchanged water were mixed and stirred. The resulting mixed solution was centrifuged (at 3,000 rpm for 10 minutes) to produce Precipitate A5. Series of operations including the operation for separation, the operation for preparing a mixed solution, and the operation for centrifugal separation, were further performed twice on Precipitate A5 to obtain Precipitate A6.

Precipitate A6 was charged into a glass beaker and dried in a dryer (at 120° C. overnight, for example, for 12 hours) to obtain Dried Solid Material A7. The Dried Solid Material A7 was charged into an alumina crucible and calcined in a calcining furnace (at 500° C. for 3 hours) to obtain aluminum phosphate support particles in the form of a powder. The aluminum content was 22 mass % in the aluminum phosphate particles.

<Production of Aluminum Zirconium Phosphate (Al$_{0.8}$Zr$_{0.2}$PO$_4$) Support Particles as Aluminum Phosphate-Based Support Particles>
(Step 1)

Solution B1 was prepared by mixing 70.1 g of Al(NO$_3$)$_3$.9H$_2$O and 500 mL of ion-exchanged water. Solution B2 was prepared by mixing 12.5 g of ZrO(NO$_3$)$_2$.2H$_2$O and 200 mL of ion-exchanged water. Solution B3 was prepared by mixing 32.3 g of phosphoric acid (phosphorus content: 85 mass %) and 500 mL of ion-exchanged water. Solution B1 and Solution B3 were mixed to prepare Solution B4, and Solution B4 and Solution B2 were mixed to prepare Solution B5. The pH of Solution B5 was adjusted to be from 4.0 to 6.0 by adding aqueous ammonia (ammonia content: 28 mass %) to Solution B5.

(Step 2)

Subsequently, the same operations as in step 2 in the synthesis of the aluminum phosphate (AlPO$_4$) support particles above were performed to obtain Al$_{0.8}$Zr$_{0.2}$PO$_4$ support particles in the form of a powder. The aluminum content was 16 mass % and the zirconium content was 14 mass % in the Al$_{0.8}$Zr$_{0.2}$PO$_4$ support particles.

Figure 1:
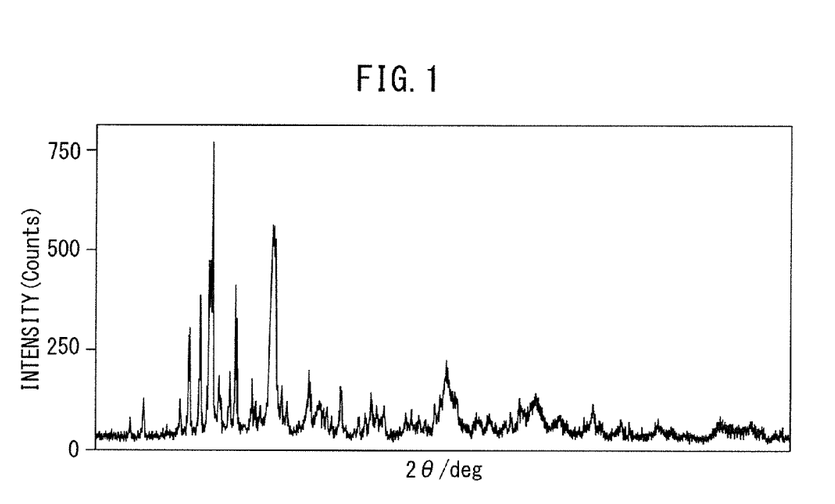
FIG. 1 is a view illustrating an X-ray diffraction pattern of $Al_{0.8}Zr_{0.2}PO_4$.

The crystal structure of the Al$_{0.8}$Zr$_{0.2}$PO$_4$ support particles was determined by X-ray diffraction measurement, and FIG. 1 illustrates the X-ray diffraction pattern of the Al$_{0.8}$Zr$_{0.2}$PO$_4$ support particles. It is appreciated from FIG. 1 that the X-ray diffraction pattern of the Al$_{0.8}$Zr$_{0.2}$PO$_4$ support particles is substantially the same as the X-ray diffraction pattern of AlPO$_4$.

<Production of Al-, Zr-, and Ti-Containing Composite Oxide (Al—Zr—Ti Composite Oxide) Support Particles>

The composite oxide (Al—Zr—Ti composite oxide) support particles containing Al, Zr, and Ti were acquired from Sakai Chemical Industry Co., Ltd. The aluminum content was 31 mass %, the zirconium content was 22 mass %, and the titanium content was 11 mass % in the Al—Zr—Ti composite oxide.

<Production of Al- and Ce-Containing Composite Oxide (Ce—Al Composite Oxide) Support Particles>
(Step 1)

Solution C1 was obtained by mixing 16.3 g of Ce(NO$_3$)$_3$.6H$_2$O, 234.5 g of Al(NO$_3$)$_3$.9H$_2$O, and 1,000 mL of ion-exchanged water and stirring the mixture over 1 hour. The pH of Solution C1 was adjusted to 9.0 by adding aqueous ammonia (ammonia content: 28 mass %) to Solution C1, and Precipitate C2 was thereby produced.

(Step 2)

Precipitate C2 was separated from Solution C1, and Precipitate C2 was washed with ion-exchanged water, dried in a dryer (at 120° C. for 2 hours), and calcined in a calcining furnace (at 300° C. for 2 hours) to obtain Al- and Ce-containing composite oxide (Ce—Al composite oxide) support particles. The mass ratio of aluminum oxide:cerium oxide was 84:16 in the Ce—Al composite oxide support particles. In addition, the aluminum content was 44 mass % and the cerium content was 13 mass % in the Ce—Al composite oxide support particles.

<Production of Zirconium Phosphate (ZrP$_2$O$_7$) Support Particles>
(Step 1)

Solution D1 was prepared by mixing 80.2 g of ZrO(NO$_3$)$_2$.2H$_2$O and 800 mL of ion-exchanged water. Solution D2 was prepared by mixing 32.3 g of phosphoric acid (phosphorus content: 85 mass %) and 500 mL of ion-exchanged water. Solution D1 and D2 were mixed to prepare Solution D3. The pH of Solution D3 was adjusted to be from 4.5 to 9.0 by adding aqueous ammonia (ammonia content: 28 mass %) to Solution D3, and Precipitate D4 was thereby produced.

(Step 2)

Precipitate D4 was separated from Solution D3 and washed with ion-exchanged water, dried in a dryer (at 120° C. overnight, for example, for 12 hours), and calcined in a calcining furnace (at 900° C. for 5 hours), and ZrP$_2$O$_7$ support particles were thereby produced. The zirconium content was 34 mass % in the ZrP$_2$O$_7$ support particles.

<<Synthesis of Catalyst>>
<Synthesis of Rh/Al—Zr—Ti Composite Oxide Catalyst>

Solution E1 was prepared by mixing 12.1 g of Rh(NO$_3$)$_3$ (Rh content: 2.75 mass %) and 37 mL of ion-exchanged water. Solution E1 and 33.0 g of Al—Zr—Ti composite oxide were mixed to prepare Solution E2. The solvent of Solution E2 was evaporated by heating to obtain Dried Solid Material E3. Dried Solid Material E3 was dried in a dryer (at 120° C. overnight, for example, for 12 hours), pulverized, and calcined in a calcining furnace (at 500° C. for 2 hours) to obtain a Rh/Al—Zr—Ti composite oxide catalyst as a Rh catalyst.

<Synthesis of Rh/{0.85Al—Zr—Ti Composite Oxide+0.12AlPO$_4$+0.03ZrP$_2$O$_7$} Catalyst>

Synthesis of a Rh catalyst was performed in the same manner as in the synthesis of Rh/Al—Zr—Ti composite oxide catalyst except the Al—Zr—Ti composite oxide was replaced by the Al—Zr—Ti composite oxide, AlPO$_4$, and ZrP$_2$O$_7$ in a ratio of 0.85:0.12:0.03. By this synthesis, a Rh/{0.85Al—Zr—Ti composite oxide+0.12AlPO$_4$+0.03ZrP$_2$O$_7$} catalyst as a Rh catalyst was obtained.

<Synthesis of Rh/{(1−x)Al—Zr—Ti Composite Oxide+xAlPO$_4$} Catalyst>

Synthesis of a Rh catalyst was performed in the same manner as in the synthesis of Rh/Al—Zr—Ti composite oxide catalyst except the Al—Zr—Ti composite oxide was replaced by the Al—Zr—Ti composite oxide and AlPO$_4$ in a ratio of (1−x):x (x is 0.075, 0.150 and 0.300). By this synthesis, a Rh/{(1−x)Al—Zr—Ti composite oxide+xAlPO$_4$} catalyst as a Rh catalyst was obtained.

<Synthesis of Rh/{(1−x)Al—Zr—Ti Composite Oxide+xAl$_{0.8}$Zr$_{0.2}$PO$_4$} Catalyst>

Synthesis of a Rh catalyst was performed in the same manner as in the synthesis of Rh/Al—Zr—Ti composite oxide catalyst except the Al—Zr—Ti composite oxide was replaced by the Al—Zr—Ti composite oxide and Al$_{0.8}$Zr$_{0.2}$PO$_4$ in a ratio of (1−x):x (x is 0.075, 0.150 and 0.300). By this synthesis, a Rh/{(1−x)Al—Zr—Ti composite oxide+xAl$_{0.8}$Zr$_{0.2}$PO$_4$} catalyst as a Rh catalyst was obtained.

<Synthesis of Pt/Al—Zr—Ti Composite Oxide Catalyst>

Solution F1 was prepared by mixing 5.4 g of a dinitrodiamine platinum(II) nitrate solution (Pt content: 8.6 mass %) and 10 mL of ion-exchanged water. Solution F1 and 46.3 g of Al—Zr—Ti composite oxide were mixed to prepare Solution F2. The solvent of Solution F2 was evaporated by heating to obtain Dried Solid Material F3. Dried Solid Material F3 was dried in a dryer (at 120° C. overnight, for example, for 12 hours), pulverized, and calcined in a calcining furnace (at 750° C. for 2 hours) to obtain a Pt/Al—Zr—Ti composite oxide catalyst as a Pt catalyst.

<Synthesis of Pt/Ce—Al Composite Oxide Catalyst>

Synthesis of a Pt catalyst was performed in the same manner as in the synthesis of Pt/Al—Zr—Ti composite oxide catalyst except the Al—Zr—Ti composite oxide was replaced by a Ce—Al composite oxide. By this synthesis, a Pt/Ce—Al composite oxide catalyst as a Pt catalyst was obtained.

<Synthesis of Exhaust Gas Purification Catalyst>

Mixed Catalyst G1 was prepared by mixing 11.6 g of a Rh catalyst and 11.6 g of a Pt catalyst. Solution G2 was prepared by mixing 2.55 g of barium acetate as a NOx storing material and 50 mL of ion-exchanged water. Mixed Catalyst G1 and Solution G2 were mixed to prepare Solution G3. Solution G3 was dried in a dryer (at 120° C. for 2 hours) and calcined in a calcining furnace (at 500° C. for 2 hours) to obtain the exhaust gas purification catalysts of Examples 1 to 10, Reference Examples 1 to 4, and Comparative Examples 1 to 2.

The composition of each of the exhaust gas purification catalysts of Examples 1 to 4 and 9, Reference Examples 1 and 2, and Comparative Example 1 are shown in Table 1 below, and the composition of each of the exhaust gas purification catalysts of Examples 5 to 8 and 10, Reference Examples 3 and 4, and Comparative Example 2 are shown in Table 2 below.

TABLE 1

| | Rh-Supported Catalyst | | Pt-Supported Catalyst |
|---|---|---|---|
| | Composition | X | |
| Example 1 | Rh/{(1 − x)Al—Zr—Ti composite oxide + xAlPO$_4$} | 0.075 | Pt/Al—Zr—Ti composite oxide |
| Example 2 | | 0.150 | |
| Reference Example 1 | | 0.300 | |
| Example 3 | Rh/{(1 − x)Al—Zr—Ti composite oxide + xAl$_{0.8}$Zr$_{0.2}$PO$_4$} | 0.075 | |
| Example 4 | | 0.150 | |
| Reference Example 2 | | 0.300 | |
| Example 9 | Rh/{0.85Al—Zr—Ti composite oxide + 0.12AlPO$_4$ + 0.03ZrP$_2$O$_7$} | — | |
| Comparative Example 1 | Rh/Al—Zr—Ti composite oxide | — | |

TABLE 2

| | Rh-Supported Catalyst | | Pt-Supported Catalyst |
|---|---|---|---|
| | Composition | Y | |
| Example 5 | Rh/{(1 − y)Al—Zr—Ti composite oxide + yAlPO$_4$} | 0.075 | Pt/Ce—Al composite oxide |
| Example 6 | | 0.150 | |
| Reference Example 3 | | 0.300 | |
| Example 7 | Rh/[(1 − y)Al—Zr—Ti composite oxide + yAl$_{0.8}$Zr$_{0.2}$PO$_4$} | 0.075 | |
| Example 8 | | 0.150 | |
| Reference Example 4 | | 0.300 | |
| Example 10 | Rh/{0.85Al—Zr—Ti composite oxide + 0.12AlPO$_4$ + 0.03ZrP$_2$O$_7$} | — | |
| Comparative Example 2 | Rh/Al—Zr—Ti composite oxide | — | |

<<Evaluation>>

For the exhaust gas purification catalyst of each Example, an evaluation of sulfur poisoning resistance, an evaluation of recovery of the sulfur-poisoned catalyst, and an evaluation of exhaust gas purifying performance were performed.

<Evaluation of Sulfur Poisoning Resistance>

The evaluation of sulfur poisoning resistance was specifically performed by calcining the exhaust gas purification catalyst of each Example under the conditions of air atmosphere, 750° C. and 33 hours, bringing Test Gas 1 into contact with the exhaust gas purification catalyst under the conditions of 400° C. and 2 hours, and measuring the sulfur component adsorbed to the exhaust gas purification catalyst by means of a carbon-sulfur analyzer (HORIBA Carbon Sulfur Analyzer EMIR 920V). The results are shown in FIGS. 2 and 3.

Incidentally, the exhaust gas purification catalyst of each Example used in the evaluation was pelletized to a mass of 2 g, and Test Gas 1 was composed of $CO_2$: 10%, $O_2$: 7%, $C_3H_6$: 200 ppm, NO: 400 ppm, $SO_2$: 500 Ppm, $H_2O$: 4%, and $N_2$: balance.

The sulfur poisoning amount (mass %) corresponds to the ratio of the mass of $SO_2$ adsorbed by the exhaust gas purification catalyst relative to the mass of the exhaust gas purification catalyst subjected to sulfur poisoning treatment.

Figure 2:
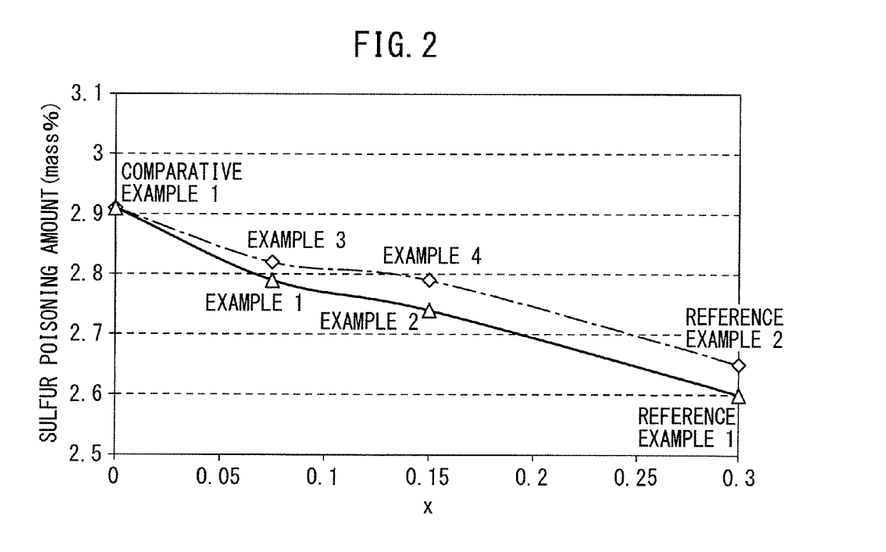
FIG. 2 is a view illustrating the relationship between the proportion (x) of $AlPO_4$ or $Al_{0.8}Zr_{0.2}PO_4$ as support particles in a Rh catalyst and the sulfur poisoning amount (mass %) when the exhaust gas purification catalysts of Comparative Example 1, Examples 1 to 4, and Reference Examples 1 and 2 are subjected to a sulfur poisoning treatment.
Figure 3:
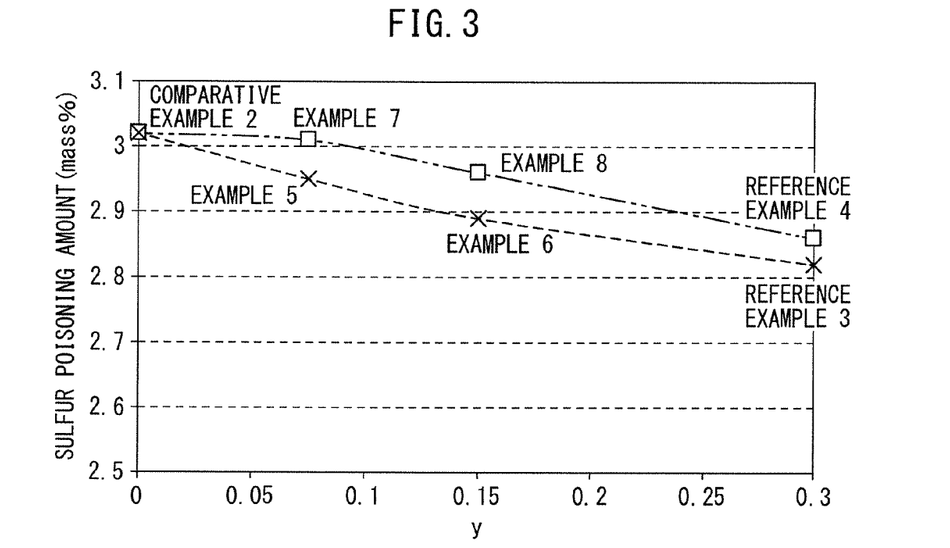
FIG. 3 is a view illustrating the relationship between the proportion (y) of $AlPO_4$ or $Al_{0.8}Zr_{0.2}PO_4$ as support particles in a Rh catalyst and the sulfur poisoning amount (mass %) when the exhaust gas purification catalysts of Comparative Example 2, Examples 5 to 8, and Reference Examples 3 and 4 are subjected to a sulfur poisoning treatment.

FIG. 2 is a view comparing the exhaust gas purification catalyst of Comparative Example 1 with the exhaust gas purification catalysts of Examples 1 and 2 and Reference Example 1. It is seen from this figure that when the proportion (x) of AlPO$_4$ as support particles in the Rh catalyst contained in the exhaust gas purification catalyst is increased, the sulfur poisoning amount (mass %) decreases.

This is believed to be due to the fact that the aluminum phosphate-based support particles, which is an acidic support, has high capability of suppressing adsorption of SOx to the support.

In addition, it is seen from FIG. 2 that with respect to the exhaust gas purification catalysts of Examples 3 and 4 and Reference Example 2 using $Al_{0.8}Zr_{0.2}PO_4$ in place of $AlPO_4$ of Examples 1 and 2 and Reference Example 1, there is the same tendency as above.

Accordingly, it is understood that when the proportion of $AlPO_4$ or $Al_{0.8}Zr_{0.2}PO_4$ in the exhaust gas purification catalyst, in particular, in the Rh catalyst contained therein, is increased, the sulfur poisoning resistance of the exhaust gas purification catalyst is enhanced.

FIG. 3 is a view illustrating the relationship between the proportion (y) of $AlPO_4$ or $Al_{0.8}Zr_{0.2}PO_4$ as support particles in a Rh catalyst and the sulfur poisoning amount (mass %) when the exhaust gas purification catalysts of Comparative Example 2, Examples 5 to 8, and Reference Examples 3 and 4 are subjected to a sulfur poisoning treatment.

The same aspects as those described above for FIG. 2 are seen from FIG. 3.

<Evaluation of Recovery of Sulfur-Poisoned Catalyst>

Figure 5:
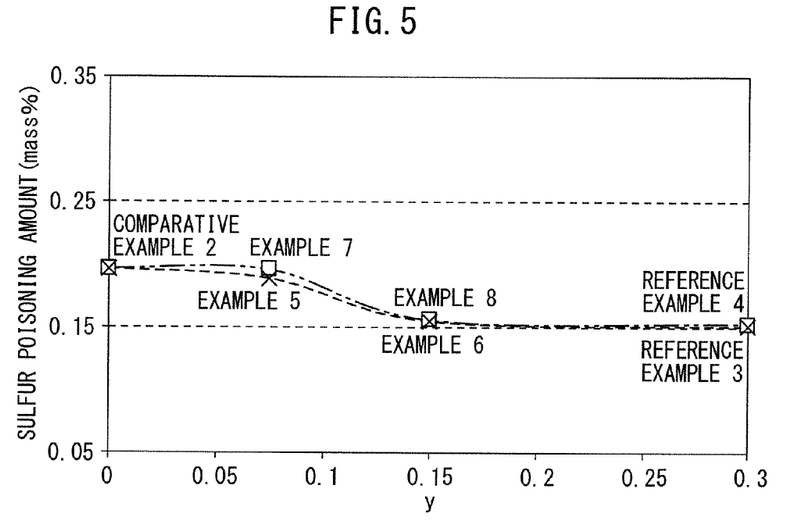
FIG. 5 is a view illustrating the relationship between the proportion (y) of $AlPO_4$ or $Al_{0.8}Zr_{0.2}PO_4$ as support particles in a Rh catalyst and the sulfur poisoning amount (mass %) when the exhaust gas purification catalysts of Comparative Example 2, Examples 5 to 8, and Reference Examples 3 and 4 are subjected to a sulfur poisoning treatment and a sulfur poisoning recovery treatment.
Figure 6:
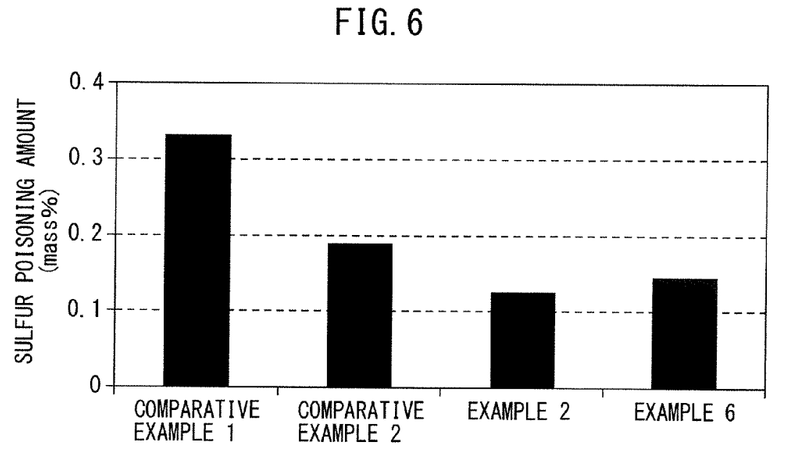
FIG. 6 is a view illustrating the sulfur poisoning amount (mass %) when the exhaust gas purification catalysts of Examples 2 and 6 and Comparative Examples 1 and 2 are subjected to a sulfur poisoning treatment and a sulfur poisoning recovery treatment.

The evaluation of recovery of the sulfur-poisoned catalyst was specifically performed by bringing Test Gas 2 into contact with the exhaust gas purification catalyst of each Example, which had been subjected to the sulfur poisoning treatment above, under the conditions of 750° C. and 3 minutes, and measuring the sulfur component adsorbed to the exhaust gas purification catalyst by means of a carbon-sulfur analyzer (HORIBA Carbon Sulfur Analyzer EMIA_920 V). The results are shown in FIGS. 4 to 6.

Test Gas 2 was composed of $CO_2$: 10%, CO: 6%, $C_3H_6$: 1,000 ppm, $H_2$: 1%, NO: 400 ppm, $H_2O$: 4%, and $N_2$: balance.

Figure 4:
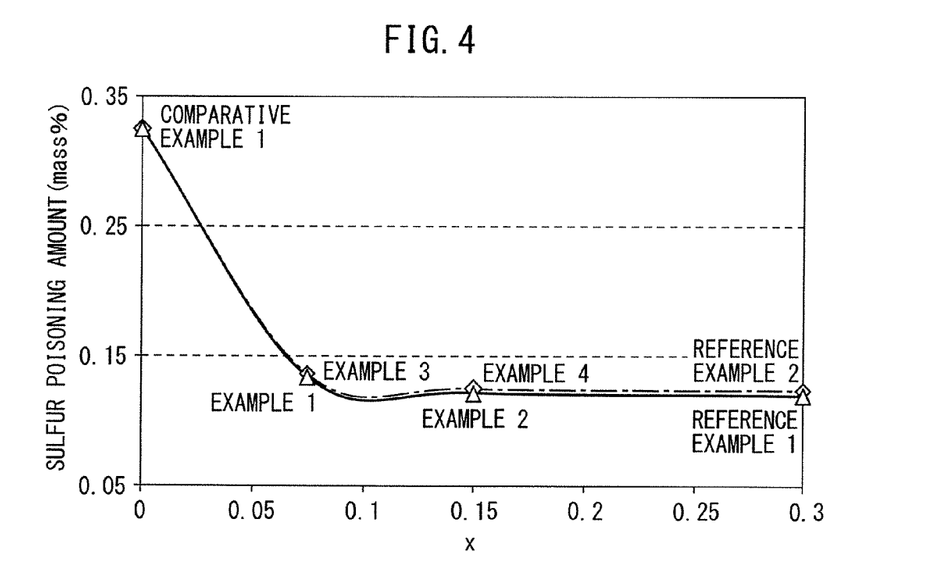
FIG. 4 is a view illustrating the relationship between the proportion (x) of $AlPO_4$ or $Al_{0.8}Zr_{0.2}PO_4$ as support particles in a Rh catalyst and the sulfur poisoning amount (mass %) when the exhaust gas purification catalysts of Comparative Example 1, Examples 1 to 4, and Reference Examples 1 and 2 are subjected to a sulfur poisoning treatment and a sulfur poisoning recovery treatment.

FIG. 4 is a view comparing the exhaust gas purification catalyst of Comparative Example 1 with the exhaust gas purification catalysts of Examples 1 and 2 and Reference Example 1. It is seen from this figure that when the Rh catalyst contained in the exhaust gas purification catalyst contains aluminum phosphate as support particles, the sulfur poisoning amount (mass %) decreases.

In addition, it is seen from FIG. 4 that with respect to the exhaust gas purification catalysts of Examples 1 and 2 and Reference Example 1, when the proportion (x) of $AlPO_4$ as support particles in the Rh catalyst contained in the exhaust gas purification catalyst is increased, the sulfur poisoning amount (mass %) further decreases.

Furthermore, with respect to the exhaust gas purification catalysts of Examples 1 and 2 and Reference Example 1, FIG. 2 after sulfur poisoning treatment and FIG. 4 after sulfur poisoning recovery treatment should be referred to. For example, it is seen that the sulfur poisoning amount of the exhaust gas purification catalyst of Example 1 is decreased to about 0.13 mass % of FIG. 4 from about 2.78 mass % of FIG. 2.

This is believed to be due to the fact that the exhaust gas purification catalyst contains aluminum phosphate-based support particles, which is an acidic support, and the adsorption power of SOx to the support is thereby weakened, as a result, the desorption of SOx is promoted.

It is also seen from FIG. 4 that with respect to the exhaust gas purification catalysts of Examples 3 and 4 and Reference Example 2, there is the same tendency as above.

FIG. 5 is a view illustrating the relationship between the proportion (y) of $AlPO_4$ or $Al_{0.8}Zr_{0.2}PO_4$ as support particles in a Rh catalyst and the sulfur poisoning amount (mass %) when the exhaust gas purification catalysts of Comparative Example 2, Examples 5 to 8, and Reference Examples 3 and 4 are subjected to a sulfur poisoning treatment and a sulfur poisoning recovery treatment.

It is seen from FIG. 5 that with respect to the exhaust gas purification catalysts of Examples 5 to 8 and Reference Examples 3 and 4, when the proportion (y) of $AlPO_4$ or $Al_{0.8}Zr_{0.2}PO_4$ as support particles in the Rh catalyst contained in the exhaust gas purification catalyst is increased, the sulfur poisoning amount (mass %) decreases.

FIG. 6 is a view comparing the exhaust gas purification catalyst of Comparative Example 1 and Comparative Example 2 with the exhaust gas purification catalyst of Example 2 and Example 6. It is seen from this figure that when the Rh catalyst contained in the exhaust gas purification catalyst contains $AlPO_4$ ($Al_{0.8}Zr_{0.2}PO_4$) as support particles, the sulfur poisoning amount (mass %) decreases.

<Evaluation of Exhaust Gas Purifying Performance>

The evaluation of exhaust gas purifying performance was specifically performed as follows.

Figure 7:
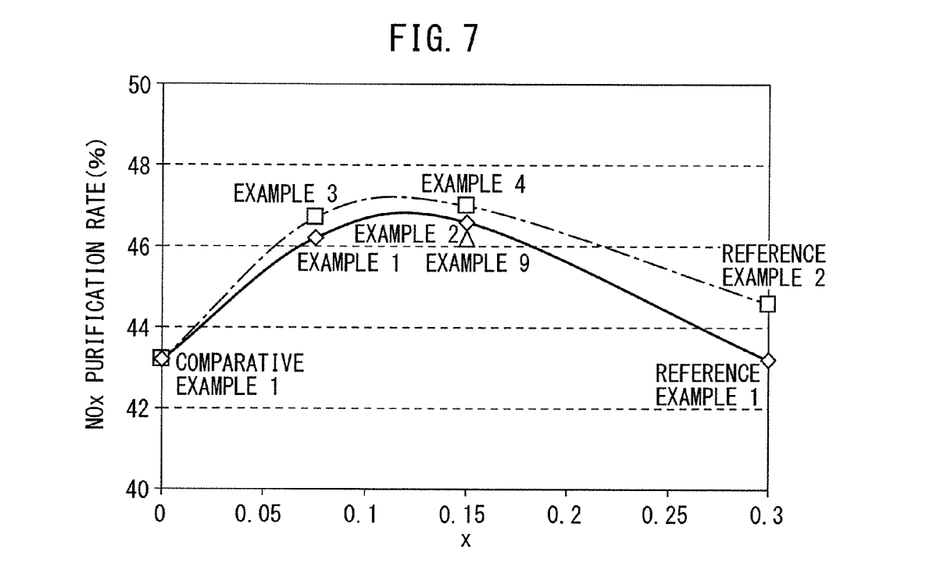
FIG. 7 is a view illustrating the relationship between the proportion (x) of $AlPO_4$ or $Al_{0.8}Zr_{0.2}PO_4$ as support particles in a Rh catalyst and the NOx purification rate (%) when the exhaust gas purification catalysts of Comparative Example 1, Examples 1 to 4 and 9, and Reference Examples 1 and 2 are subjected to a sulfur poisoning treatment and a sulfur poisoning recovery treatment.
Figure 8:
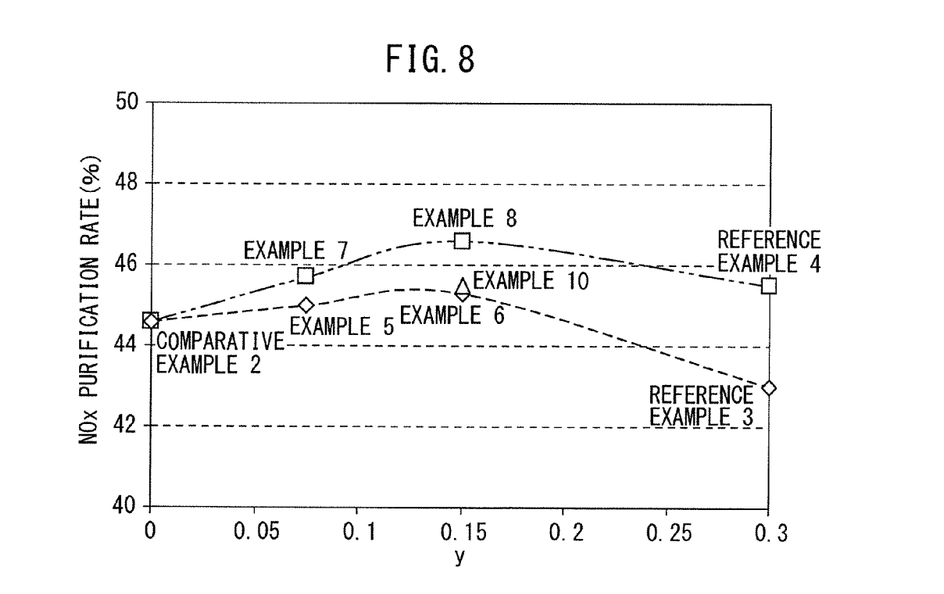
FIG. 8 is a view illustrating the relationship between the proportion (y) of $AlPO_4$ or $Al_{0.8}Zr_{0.2}PO_4$ as support particles in a Rh catalyst and the NOx purification rate (%) when the exhaust gas purification catalysts of Comparative Example 2, Examples 5 to 8 and 10, and Reference Examples 3 and 4 are subjected to a sulfur poisoning treatment and a sulfur poisoning recovery treatment.

The exhaust gas purification catalyst of each Example subjected to the above-described sulfur poisoning recovery treatment was exposed alternately to a rich gas (A/F: about 12) and a lean gas (A/F: about 22) for 15 seconds and 60 seconds, respectively, at a temperature of 300° C. and a flow rate of 10 (L/min). The cycle between the lean atmosphere and the rich atmosphere was taken as 1 cycle, and the NOx purification rate was calculated from the inlet-side NOx concentration (ppm) and the outlet-side NOx concentration (ppm). The results are shown in FIGS. 7 and 8. Furthermore, the configurations of the rich gas and the lean gas are shown in Table 3 below.

TABLE 3

| | $CO_2$ (%) | $O_2$ (%) | CO (%) | $C_3H_6$ (ppm) | $H_2$ (%) | NO (ppm) | $H_2O$ (%) | $N_2$ (%) |
|---|---|---|---|---|---|---|---|---|
| Rich gas | 10 | — | 6 | 1000 | 1 | 400 | 4 | balance |
| Lean gas | 10 | 7 | — | 200 | — | 400 | 4 | balance |

FIG. 7 is a view illustrating the relationship between the proportion (x) of $AlPO_4$ or $Al_{0.8}Zr_{0.2}PO_4$ as support particles in a Rh catalyst and the NOx purification rate (%) when the exhaust gas purification catalysts of Comparative Example 1, Examples 1 to 4 and 9, and Reference Examples 1 and 2 are subjected to a sulfur poisoning treatment and a sulfur poisoning recovery treatment.

It is seen from FIG. 7 that when the exhaust gas purification catalyst of Comparative Example 1 is compared with the exhaust gas purification catalysts of Examples 1 and 2 and Reference Example 1, the exhaust gas purification catalysts of Examples 1 and 2 and Reference Example 1 achieved a higher NOx purification rate than the exhaust gas purification catalyst of Comparative Example 1.

In addition, it is seen that when the proportion (x) of $AlPO_4$ as support particles in the Rh catalyst contained in the exhaust gas purification catalyst is from 0.000 to 0.300, in particular, from 0.075 to 0.150, the NOx purification rate is higher.

This is believed to be due to the fact that the proportion (x) of $AlPO_4$ as support particles in the Rh catalyst contained in the exhaust gas purification catalyst is in the range of value above and the adsorption of NOx to the support is thereby promoted while suppressing the adsorption of SOx to the support.

Furthermore, it is also understood from FIG. 2 that the sulfur poisoning resistance of the exhaust gas purification catalyst of Reference Example 1 is higher than that of Examples 1 and 2, and on the other hand, it is seen from FIG. 7 that the NOx purification rate of the exhaust gas purification catalyst of Reference Example 1 is lower than that of Examples 1 and 2.

This is believed to be due to the fact that the ratio of the moles of metals constituting $AlPO_4$, which is an acidic support, relative to the total moles of metals constituting an Al—Zr—Ti composite oxide as composite oxide support particles and $AlPO_4$, is excessively large, and therefore the adsorption of NOx is suppressed.

In addition, it is seen from FIG. 7 that when the exhaust gas purification catalysts of Examples 1 and 2 and Reference Example 1 are compared with the exhaust gas purification catalysts of Examples 3 and 4 and Reference Example 2, the NOx purification rate of the exhaust gas purification catalysts of Examples 3 and 4 and Reference Example 2 is higher than the NOx purification rate of Examples 1 and 2 and Reference Example 1, respectively.

FIG. 8 is a view illustrating the relationship between the proportion (y) of $AlPO_4$ or $Al_{0.8}Zr_{0.2}PO_4$ as support particles in a Rh catalyst and the NOx purification rate (%) when the exhaust gas purification catalysts of Comparative Example 2, Examples 5 to 8 and 10, and Reference Examples 3 and 4 are subjected to a sulfur poisoning treatment and a sulfur poisoning recovery treatment.

The same aspects as those described above for FIG. 7 are seen from FIG. 8.

Furthermore, it is understood from FIGS. 7 and 8 that the NOx purification rate of the exhaust gas purification catalysts of Examples 9 and 10 is slightly lower than that of Examples 2 and 6, respectively; and on the other hand, is sufficiently higher than the NOx purification rate of the conventional exhaust gas purification catalyst.

While preferred embodiments have been described in detail, it will be understood by one skilled in the art that as regards the devices, instruments, chemicals, etc., used in embodiments, the manufacturers, grades, qualities, etc., thereof can be changed.

What is claimed is:

1. An exhaust gas purification catalyst comprising:
   Rh-supporting composite oxide support particles containing Al, Zr, and Ti; and
   Rh-supporting aluminum phosphate-based support particles,
   wherein the aluminum phosphate-based support particles are support particles composed of aluminum phosphate in which a part of Al is substituted by Zr and the aluminum phosphate-based support particles are represented by the formula: $Al_\alpha Zr_{(1-\alpha)}PO_4$, where $\alpha$ is 0.80 or more and less than 1.00, and
   wherein the ratio of the mol number of metals constituting the aluminum phosphate-based support particles, relative to the total mol number of metals constituting the composite oxide support particles and the aluminum phosphate-based support particles, is 7.5% or more and 15.0% or less.

2. The exhaust gas purification catalyst according to claim 1, further comprising Pt-supporting support particles.

3. The exhaust gas purification catalyst according to claim 2, wherein the Pt-supporting support particles comprise composite oxide support particles containing Al, Zr, and Ti and/or composite oxide support particles containing Ce and Al.

4. The exhaust gas purification catalyst according to claim 3, which is a catalyst for purifying NOx.

5. The exhaust gas purification catalyst according to claim 2, which is a catalyst for purifying NOx.

6. The exhaust gas purification catalyst according to claim 1, which is a catalyst for purifying NOx.

7. An exhaust gas purifying method, comprising:
   bringing a NOx-containing exhaust gas into contact with an exhaust gas purification catalyst in a lean atmosphere to store NOx; and
   reducing and purifying the NOx stored in the exhaust gas purification catalyst in a stoichiometric atmosphere or a rich atmosphere,
   wherein the exhaust gas purification catalyst comprises:
      Rh-supporting composite oxide support particles containing Al, Zr, and Ti; and
      Rh-supporting aluminum phosphate-based support particles,
      wherein the aluminum phosphate-based support particles are support particles composed of aluminum phosphate in which a part of Al is substituted by Zr and the aluminum phosphate-based support particles are represented by the formula: $Al_\alpha Zr_{(1-\alpha)}PO_4$, and $\alpha$ is 0.80 or more and less than 1.00, and
      wherein the ratio of the mol number of metals constituting the aluminum phosphate-based support particles, relative to the total mol number of metals constituting the composite oxide support particles and the aluminum phosphate-based support particles, is 7.5% or more and 15.0% or less.

8. The exhaust gas purifying method according to claim 7, wherein the exhaust gas purification catalyst further comprises Pt-supporting support particles.

9. The exhaust gas purifying method according to claim 8, wherein the Pt-supporting support particles comprise composite oxide support particles containing Al, Zr, and Ti and/or composite oxide support particles containing Ce and Al.

* * * * *

UNITED STATES PATENT AND TRADEMARK OFFICE
CERTIFICATE OF CORRECTION

PATENT NO. : 9,925,524 B2
APPLICATION NO. : 15/211367
DATED : March 27, 2018
INVENTOR(S) : Mitsuru Sakano and Yusaku Inatomi It is certified that error appears in the above-identified patent and that said Letters Patent is hereby corrected as shown below:

In Column 9, Line 32, delete "amine" and insert --ammine--, therefor.

In Column 10, Line 50, after "Analyzer", delete "EMIR 920V" and insert --EMIA_920V--, therefor.

Signed and Sealed this
Fifth Day of June, 2018

Andrei Iancu
*Director of the United States Patent and Trademark Office*